Jan. 30, 1962 R. L. HARTWELL 3,019,281

ELECTRICAL SHIELDING AND SEALING GASKET

Filed March 4, 1960

INVENTOR
RALF L. HARTWELL

United States Patent Office 3,019,281

Patented Jan. 30, 1962

3,019,281

ELECTRICAL SHIELDING AND SEALING GASKET

Ralf Lee Hartwell, Cranford, N.J., assignor to Technical Wire Products, Inc., Springfield, N.J., a corporation of New Jersey Filed Mar. 4, 1960, Ser. No. 12,843
5 Claims. (Cl. 174—35)

This invention relates to a fluid sealing and electrical shielding arrangement for openings between surfaces and, more particularly, to an annular gasket device serving both functions.

The operation of any electrical, or electromagnetic, equipment may involve shielding it against electric, or electromagnetic, energy either entering the equipment or escaping therefrom. Where it is desired to confine such energy within a closed structure, such as a waveguide, distortion of the wave and arcing as well as dissipation of energy may be a problem. In addition, in waveguide equipment it is frequently necessary to prevent the escape of fluids maintained under pressure. Likewise, it is often important to prevent outside fluids, especially moisture and liquids, from entering the electrical equipment or the containers therefor. The simultaneous protection of a waveguide against the ingress or egress of fluids while conducting electromagnetic energy of radio frequency past a joint between abutting surfaces without dissipation or distortion is an acute problem with which this invention is especially concerned.

Yet the desirability of conjointly providing a fluid seal and an electrical shield often exists in the use of various types of electrical equipment. For example, today's manned, and unmanned, airborne vehicles carry extensive arrays of electrical equipment such as radar, communication, navigation and flight control systems which operate over a broad region of the electromagnetic spectrum. With the close proximity of various types of equipment and with the frequent use of high power, it is essential that one system be prevented from interfering with the other. Obviously, in such an environment, radio interference inducing false signals in a nearby system resulting from inadequate electrical shielding could cause the loss of the vehicles and fatal results in manned vehicles. In military equipment, the use of extremely high power radio frequency energy may be the source of severe interference. Much military receiving equipment designed to operate with very low signal strength can be made inoperative by radio interference. Yet the very delicacy of such equipment makes it very important to protect it against environmental changes due to the ingress of fluids into, or the egress of fluids from, the equipment itself or the container housing the equipment.

It is generally impractical to provide a conductive container having no openings, or seams, which could serve as a wave guide or as an enclosure for electrical equipment. Normally such containers must be provided with mating members to combine various sections of the container or to provide openings for access to the equipment so that service and maintenance may be performed. Other openings may be needed for electrical connections, cooling and other design considerations. Merely covering openings with lids, or doors, usually does not provide adequate electrical shielding or fluid sealing for such covers form seams between themselves and the container or housing, normal manufacturing techniques, weight considerations, and structural deflections make it inevitable that narrow slot openings will be present in these seams which must be sealed against the egress and ingress of fluids or electrical energy. Thus the need for conjointly providing an electrical shield and a fluid seal between abutting surfaces, as at a joint, frequently exists.

It is an important object of this invention to provide a composite gasket device which will simultaneously form a fluid seal and an electrical shield between abutting surfaces. It is a more particular object of the invention to provide a composite annular compressible gasket having an electrical shielding member attached thereto in such a manner that the gasket may be compressed between two surfaces to form a fluid tight seal therebetween without interference from the electrical shielding member.

It is a more specific object of the invention to provide a composite annular fluid sealing and electrical shielding device constructed so that upon being compressed between two surfaces the two surfaces initially contact the sealing element of the device along one contact locus and make multiple point contacts with the electrical shielding element of the device at points removed from said locus. It is a special object of the invention to provide a composite annular fluid seal and electrical shielding device constructed of material which permits its repeated use. It is another special object of the invention to provide a ring-like gasket made of an elastomeric material having attached to its inner part near the middle thereof a conductive electrical shielding device, extending short of the equal inner and outer parts of the sealing member, which expands upward and downward in conformity with the contour of the elastomeric material when the elastomeric material is compressed to thereby decrease the inside diameter of the annular elastomeric material.

It is a particular object of the invention to provide a composite fluid sealing and electrical shielding resilient gasket which provides, when compressed, a multiplicity of interconnected electrically conducting metallic paths between opposing metal surfaces wherein the electrically conductive metallic material is constructed and positioned so as to reduce possibilities of permanent set in the conductive metal during use of the gasket. Other objects and features of the invention will be apparent from the more detailed description which follows.

In accordance with an important embodiment of the invention, the objectives of the invention are achieved by providing an annular compressive fluid sealing member having a biased cut woven conductive material attached to its inner periphery and cut to a width insufficient to extend to the top and bottom of the sealing member when it is positioned for sealing but is not yet compressed. In a more particular embodiment of the invention, a composite so-called O-ring gasket made of an elastomeric material is provided having a bias cut conductive woven wire cloth attached to, and centrally positioned on, its inner periphery. The wire cloth attached to the elastomeric ring has its overlapping ends resistance welded to one another and it is pre-cut to a width which approximates half, but is less than half, the circumference of a cross section of the elastomeric ring. This type of gasket is especially well adapted for forming a fluid seal and an electrical shield between mating element in a wave guide housing and the contact locus for the elastomeric member and exposed ends of the wire cloth can be predetermined so that a good fluid seal and electrical shield are simultaneously obtained.

It has been found that resilient material heretofore used in gaskets may be used in the gaskets of this invention although certain elastomeric materials such as polymerized chloroprene (neoprene) and silicone rubbers or equivalent materials are preferred due to their ability to function over wide temperature ranges, their chemical resistance and their resistance to atmospheric oxidative and other types of deterioration.

The woven conductive material may be obtained by cutting readily available wire cloth on the bias to a desired width such that upon being centrally positioned and attached to the inside of an annular resilient fluid seal it will initially come in contact with the two abutting surfaces at points removed from the initial points of contact between the abutting surfaces and the resilient fluid seal. Woven wire cloth is readily available having sufficiently small openings to form an efficient electrical shield and, due to the minimized distortion when bias cut woven wire is compressed, a variety of woven metal cloths have proven to have acceptable properties. It has been found that the wire cloth may be attached to the resilient material by an adhesive although it may be partially molded into the inner side of the resilient elastomeric fluid sealing material provided upper and lower ends of the wire are left exposed for contact with abutting surfaces when the composite gasket is compressed therebetween. The wire should be attached so that it curves in the direction of the elastomeric surface. Normally wire is woven so that the strands are at right angles to one another and is bias cut so, when the plane of the wire is perpendicular to the abutting surfaces, both the warp and woof strands contact the abutting surfaces at 45° angles. In this way, upon compression, the size of the bending radius and the tension on the various wires are of the same order. Also with such a bias cut any lessening of the inside diameter of the annular resilient seal due to compression would then have an equal effect upon the movement of the strands due to its pinching effect upon the scissors action of the strands. It will be understood, however, that "bias cut" is used herein to indicate that both the warp and woof strands of a woven conductive material have been cut.

In a particular embodiment of the invention, a Phosphor bronze woven wire cloth having .0045 inch strands and 100 strands to the inch in each direction was cut on the bias in the manner described in the preceding paragraph and then centrally positioned and adhesively attached to the inside of a silicon rubber O-ring adapted for use as a fluid seal between adjacent surfaces in a waveguide housing. The wire was cut so that its width was slightly less than half the circumference of a cross section of the O-ring. When the composite electrical shield and liquid seal was then compressed into sealing relationship with the waveguide housing, the initial points of contact with the silicon rubber ring and with the multiplicity of exposed ends of the wire cloth were spaced from one another. In this way, excellent electrical contact was established between abutting surfaces of the housing without interfering with good contact between the housing and the fluid sealing element of the composite gasket. Due to the resilient properties of the O-ring and due to the fact a minimum compressive distortion was exerted on the electrical shielding element of the gasket, it was found the composite gasket could be repeatedly used to effectuate simultaneously an excellent fluid seal and electrical shield for the waveguide housing. Even where the abutting surfaces were subjected to vibration or shock, the fatigue properties of the metal conductors proved adequate.

An understanding of the invention will be facilitated by the illustrative embodiments of the invention disclosed in the accompanying drawings wherein.

Figures 1, 2, 3, 4, 5:
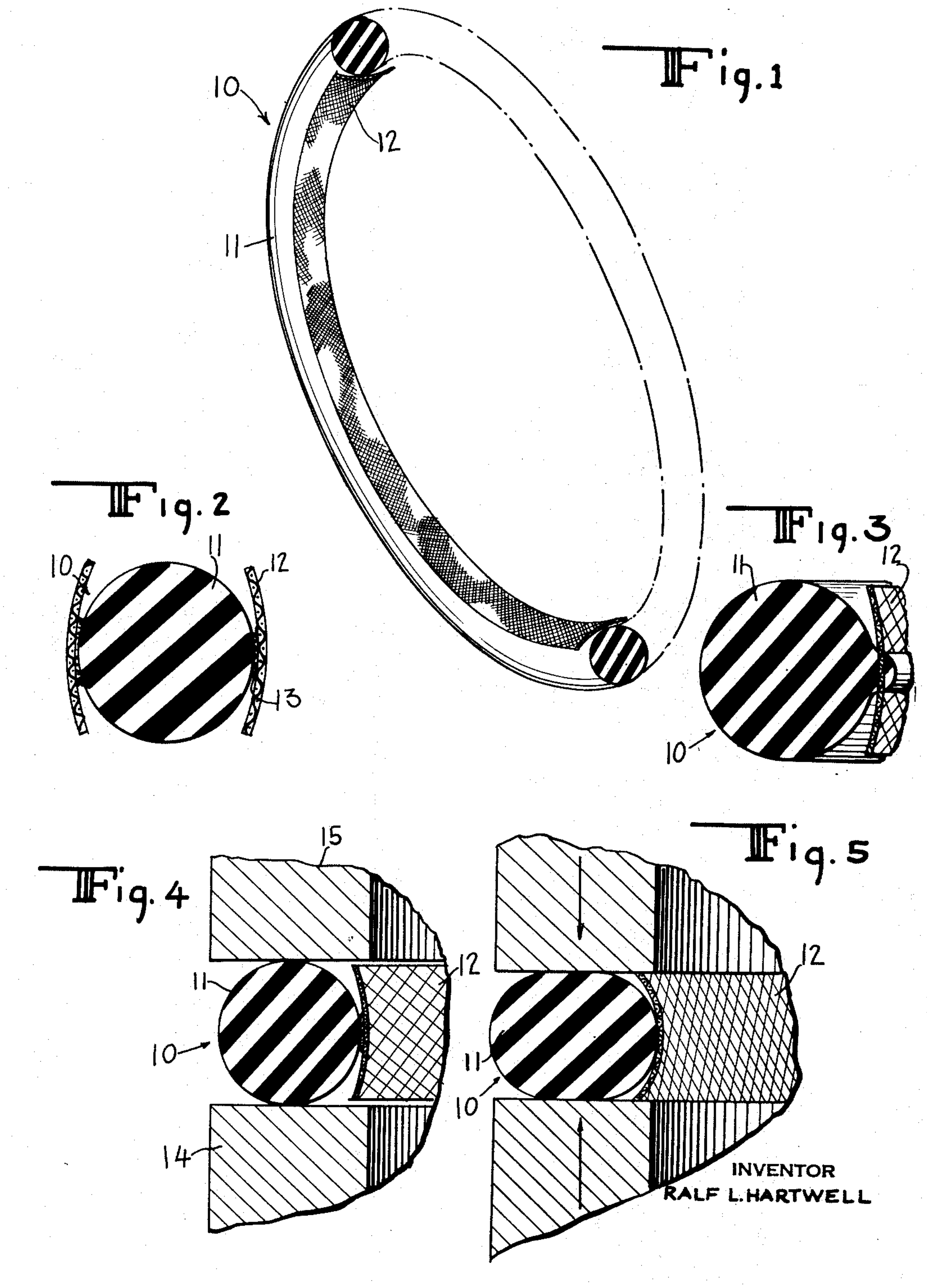
FIG. 1 is a perspective view of a composite electrical shielding and fluid sealing gasket.
FIG. 2 is a sectional view of an electrically shielding and fluid sealing gasket in which a shielding element is adhesively attached to the inner side of the fluid sealing element and also to the outer side thereof.
FIG. 3 is a sectional view, similar to FIG. 2, in which the shielding element is molded into the fluid sealing element adjacent its inside diameter.
FIG. 4 is a sectional view of a gasket, such as shown in FIG. 1, positioned between two abutting surfaces but in an uncompressed state.
FIG. 5 is a sectional view of the gasket in FIG. 4 after the gasket has been compressed into fluid sealing and electrical shielding relationship with the two abutting surfaces.

The composite gasket 10 of this invention, as illustrated in the accompanying drawings, comprises an annular compressible fluid sealing material 11, such as a resilient elastomeric material or the like, having a bias cut woven conductive material 12 centrally attached to its inner side so that the woven material 12 curves in the direction of the resilient material 11. The conductive material 12 may be woven wire mesh made of conductive and resilient material having a sufficiently fine gauge to effectuate the desired shielding.

As shown in FIGS. 1 and 2, the resilient woven wire 12 is firmly attached to the resilient material 11 by the adhesive material 13. A variety of adhesives, many of a resinous nature, are known which will firmly bond a metal cloth to elastic and plastic fluid sealing materials.

As shown in FIG. 3, the wire cloth 12 is molded into the body of the elastomer 11.

With the gasket material positioned in an uncompressed state between abutting surfaces 14 and 15, as shown in FIG. 4, the resilient material 11 first comes in contact with the two abutting surfaces 14 and 15 without the woven wire 12 interfering with the surface-to-surface contact between surfaces 13 or 14 and the surface of the resilient material 11. In the embodiment illustrated in FIG. 2, it will be apparent that the width of the bias cut woven wire cloth, or screen, 12 before being attached to the resilient material 11 must be less than one half the circumference of the circular cross section of the resilient material 11 provided the attached wire cloth is not to interfere with the fluid seal formed between this material and the surfaces 14 and 15. If the wire cloth 12 had a width equal to, or greater, than one half said circumference it would necessarily interfere with the contact between the resilient material 11 and at least one of the surfaces 14 or 15. In the embodiment illustrated in FIG. 3, the woven wire 12 would normally be cut to an even more narrow width. Where O-rings are used, the woven wire 12 is most advantageously cut to width greater than the diameter of a cross section of the ring but less than its hemicircumference.

In order that both fluid sealing and electrical shielding be effectuated, however, it is desirable that the width of the wire screen be selected so that good electrical contact is established between surfaces 14 and 15 by the time a good fluid seal is established between these surfaces and the resilient material 11. Where the compressible material is strongly resistant to compression, the width of the wire cloth 12 should closely approximate one half the cross-sectional circumference of the resilient material 11. Where more easily compressed materials are used, as the resilient material 11, the width of the cloth 12 may vary more markedly from said hemi-circumference but not necessarily.

Where the annular material has a flat upper and lower surface, the attached woven material should still have a width less than half the distance around a cross section of the annular fluid sealing element and normally would have a width slightly less than the height of the fluid sealing element.

As shown in FIG. 5, a good fluid seal has been established between the abutting surfaces 14 and 15 and the resilient material 11 by moving the surfaces 14 and 15 into closer proximity to one another. At the same time multiple point contact has been established between the exposed ends of the wire screen 12 and the surfaces 14 and 15. These contacts are established both by the movement of the surfaces 14 and 15 in closer proximity to one another and by the pinching effect upon the cloth 12 caused by a lessening of the inside diameter of the annular gasket 10. Yet due to the bias cut of the wire cloth and the scissors action of the strands, adequate thrust is exerted to establish good electrical contact without distorting the strands to the point where they will not recover their original state upon removing the pressure from gasket 10. Due to the bias cut of the wire, the bending radius of the strands of the wire cloth 12 as it is compressed to approximate the contour of the resilient material 11 is less than it would be if it were not cut on the bias. Also, where the cloth is cut so that the initial angle of contact with surfaces 14 and 15 are the same, it is seen the thrust will be equally distributed on all the strands. Yet some of the advantages of this invention are obtained whenever both the warp and woof strands are out.

It will be understood that annular is used herein in its generic sense to include any type of continuous material forming a complete cycle regardless of whether it is a circular, rectilinear or in some other continuous form returning into itself. The foregoing discussion has made it apparent that some of the advantages of this invention are best realized when the gasket hereof are annular in form. Yet many of the advantages of the use of a compressible fluid sealing element and a woven bias cut conductive material to form a composite gasket, wherein the conductive material is selected so that a fluid seal can be established and an electrical shield developed between abutting serfaces without the woven conductive material interfering with the fluid seal, are obtained regardless of whether the gasket is annular or some other shape such as a simple linear strip.

In the embodiment shown in FIG. 2, the bias cut resilient woven conductive wire 12 is attached to both the inner and outer periphery of the O-ring. When the gasket is in use, it will be apparent that the pinching effect is exerted only on the woven wire positioned on the inner periphery. Nevertheless, especially in situations involving high power, two substantially parallel shielding conductors with a gap in between to permit the formation of a good fluid seal may be necessary, or desirable, in effecting a wholly satisfactory composite fluid sealing and electrical shielding function. The width of the woven wire attached to the outer periphery may be selected such that electrical contact is established when using the gasket without relying on a pinching effect.

It will be apparent to those skilled in the art that the illustrative embodiments shown in the drawings are exaggerated to better illustrate features of the invention and that electrical contact between the abutting surfaces is not limited to contact through the strands of the woven conductive material.

It will be understood that the composition of the fluid sealing component and the electrical shielding component of the composite gasket hereof may be modified and substitutions made therein by those skilled in the art to which this invention appertains without departing from the spirit of the invention or scope of the invention as defined in the appended claims.

What is claimed is:

1. A composite electrical shielding and fluid sealing gasket for closing an opening between two abutting conductive surfaces, comprising a compressible fluid sealing member and a bias cut woven conductive material attached thereto, said bias cut material being cut to a width and centrally positioned relative to a side of said sealing member so that upon compressing said gasket between said surfaces to form a fluid seal and an electrical shield therebetween the locus of the initial points of contact with said sealing member and the locus of the initial points of contact with said woven conductive material are spaced from one another.

2. A composite electrical shielding and fluid sealing gasket for closing an opening between two abutting conductive surfaces, comprising a compressible annular fluid sealing member and a bias cut woven conductive material attached adjacent the inner part of said sealing member, said bias cut material being cut to a width and centrally positioned relative to the inside of said sealing member so that upon compressing said gasket between said surfaces to form a fluid seal and an electrical shield therebetween the locus of the initial points of contact with said sealing member and the locus of the initial points of contact with said woven conductive material are spaced from one another.

3. A combined electrical shield and fluid seal for closing an opening between two surfaces, comprising an annular, compressible fluid sealing member and a biased cut, woven conductive mesh member attached adjacent the inner part of said sealing member and extending short of the annular dividing line between the equal inner and outer parts of the sealing member so that, when the annular sealing member is compressed to form a fluid tight seal, the edges of said biased cut woven mesh member come into multiple point contact with said two surfaces thereby shielding undesired electrical radio interference through said opening.

4. A composite electrical shielding and fluid gasket for closing an opening between two abutting conductive surfaces, comprising an annular elastomeric member and a bias cut woven wire centrally attached adjacent the inner part of said member, said bias cut wire having a width less than half the circumference of the cross section of said member so that when the member is compressed to form a fluid seal, the edges of said bias cut wire come into multiple point contact with said surfaces without interfering with said fluid seal.

5. A composite electrical shielding and fluid sealing gasket for closing an opening between two abutting conductive surfaces, comprising a compressible fluid sealing member, a bias cut woven conductive material respectively attached to each of two opposite sides of said member, said bias cut material being cut to a width and centrally positioned relative to said sides so that upon compressing said gasket between said surfaces to form a fluid seal and an electrical shield therebetween the locus of the initial points of contact with said sealing member lies between the respective loci of the initial points of contact with said woven conductive materials.

References Cited in the file of this patent

UNITED STATES PATENTS 2,783,295 Ewing ---------------- Feb. 26, 1957

OTHER REFERENCES

Publication I: "Supressing Radio Interference With Metex Shielding Products," published by Metal Textile Corporation, Electronics Division, Roselle, N.J.